United States Patent [19]

Wanek

[11] 3,832,486

[45] Aug. 27, 1974

[54] MODULATOR CLAMP CIRCUIT

[75] Inventor: Paul Victor Wanek, Mount Prospect, Ill.

[73] Assignee: Warwick Electronics Inc., Chicago, Ill.

[22] Filed: Mar. 16, 1973

[21] Appl. No.: 342,317

[52] U.S. Cl. .......... 178/7.1

[51] Int. Cl. .......... H04n 5/40

[58] Field of Search .......... 178/7.1, 7.2, DIG. 26, 178/7.3 DC, 7.5 DC; 325/138; 332/48, 49, 44

[56] References Cited

UNITED STATES PATENTS

| | | | |
|---|---|---|---|
| 2,550,178 | 4/1951 | Wendt | 178/7.1 |
| 2,564,017 | 8/1951 | Maggio | 178/7.1 |
| 2,835,869 | 5/1958 | Morrison | 332/48 |
| 3,175,170 | 3/1965 | Duyne | 325/138 |
| 3,557,305 | 1/1971 | Dann | 178/7.1 |

*Primary Examiner*—Richard Murray
*Assistant Examiner*—Jin F. Ng
*Attorney, Agent, or Firm*—Wegner, Stellman, McCord, Wiles & Wood

[57] ABSTRACT

A video tape recorder system includes a modulator circuit for modulating an RF carrier with video information derived from scanning a video tape. The modulator circuit is formed by a differential amplifier with a series capacitor-resistor network between a pair of inputs of the differential amplifier to effectively cancel, by means of common mode rejection, an AC portion of the video information. A diode-capacitor network connected with one differential amplifier input reinserts DC into the video information signal, and forms a part of a temperature compensated bias supply for the inputs of the differential amplifier.

14 Claims, 12 Drawing Figures

MODULATOR CLAMP CIRCUIT

BACKGROUND OF THE INVENTION

This invention relates to a modulator circuit using a differential amplifier.

In a television modulation system, a modulator circuit amplitude modulates an RF carrier with a composite video signal, and mixes an FM audio signal with the AM carrier to create a composite television signal. Approximately 85 percent modulation at the sync tip voltage level should be maintained regardless of the amplitude of the video modulating signal. The modulator circuit must also provide for DC reinsertion if the video signal has been AC coupled to the modulator circuit.

The sophisticated circuitry which accomplishes the above requirements in a commercial broadcast station cannot be justified for a video tape recorder system which includes a modulator circuit for reconstructing from a video tape a composite television signal for direct coupling to an unaltered television receiver. Although such a video tape recorder modulator circuit is actually a low power television transmitter, simple circuitry is desirable without compromising the output performance necessary for satisfactory television reception.

SUMMARY OF THE INVENTION

In accordance with the present invention, a novel modulator circuit using a differential amplifier accomplishes the above desired objectives with minimum and simple circuitry. As a result, the modulator circuit is especially adaptable for use in a video tape recorder system which generates a broadcast type output signal for coupling to an unaltered television receiver.

The modulator circuit includes an AC coupling path between a pair of inputs of the differential amplifier for subtracting an AC portion of the video signal due to common mode rejection. A diode and capacitor network provides DC reinsertion with respect to the level of the sync pulse tips. The network forms a part of a biasing circuit which generates a pair of biases which track for temperature changes.

One object of this invention is the provision of a differential amplifier modulator circuit which includes simple networks for maintaining a desired modulation level, for providing DC reinsertion, and/or for providing stable biases which track with temperature changes.

Further objects and features of the invention will be apparent from the following description, and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. While values will be given for certain of the components in order to disclose a complete, operative embodiment of the invention, it should be understood that such values are merely representative and are not critical unless specifically so stated.

DESCRIPTION OF THE PREFERRED EMOBIDMENTS

Figure 1:
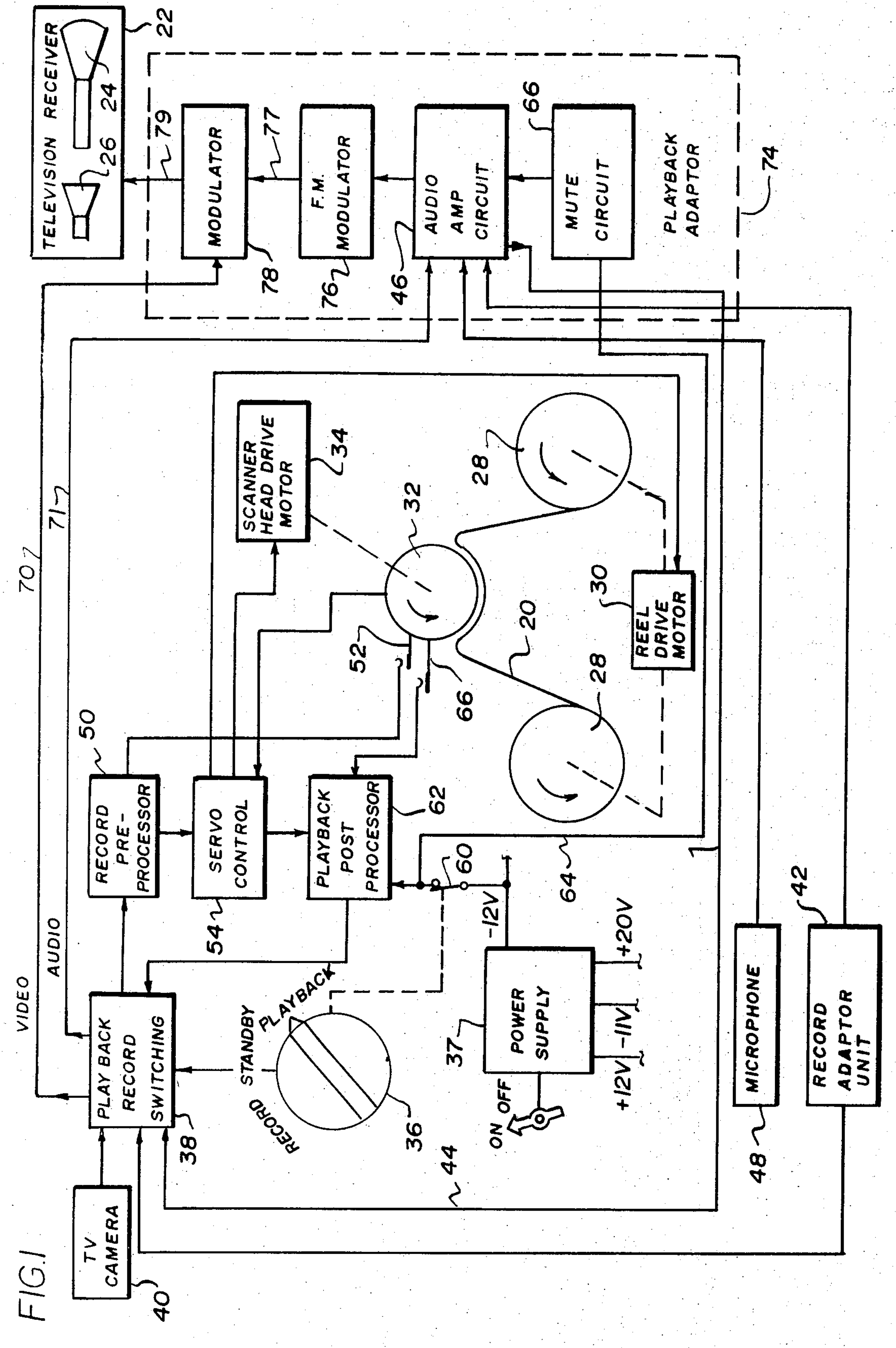
FIG. 1 is a block diagram of a video tape recorder system including the novel modulator circuit.

Turning to FIG. 1, a video tape recorder (VTR) includes a recording medium 20, such as magnetic tape, which stores video, audio and synchronizing signals which are to be reproduced by a conventional television receiver 22. The receiver includes a video image reproducer 24, such as a tribeam color cathode ray tube, and an audio reproducer 26, such as a dynamic loudspeaker. A pair of storage tape reels 28 are driven by a reel drive motor 30 in order to move the tape medium 20 past a scanner head assembly 32 which may include three magnetic heads spaced approximately 120° apart. The scanner head assembly 32 is rotated at a high speed (such as 1200 rpm) by a scanner head drive motor 34 past the relatively slow moving tape (driven for example at 3.8 IPS).

The scanner head assembly 32 and tape 20 are mounted so that the tape moves on a diagonal to the plane of scanner rotation, as is conventional in a VTR, to produce a series of helical tracks each of which records one field of video information. Three linear tracks are also provided on the tape, comprising two audio tracks and one control track which contains a series of pulses corresponding to the recorded vertical fields.

A mode switch 36 controls a playback/record switching circuit 38, and a switch (to be described) concerned with power supply voltages from a power supply 37. The switching circuit 38 includes a plurality of inputs connected, for example, to a television camera 40, a record adapter unit 42 for a record player, and an audio output line 44 of an audio amplifier circuit 46 which may have an input from a microphone 48 used in conjunction with the television camera 40. An additional input, not illustrated for clarity, is coupled from the television receiver 22, in order to record live television programs which are being received.

A selected one of the inputs is coupled, when mode switch 36 is in a "record" position, by switching circuit 38 to a record pre-processor 50 for transmission to a record input 52 of the scanner head assembly 32. The record pre-processor 50 generates control signals for a servo control 54 which controls the speed of the reel drive motor 30 and the scanner head drive motor 34. Conservation of the recording medium requires that the composite video signal be modified. Reduction of total bandwidth is accomplished within record pre-processor 50. Information density may be further modified by employing a technique known as skip field recording, in which only every third field is recorded. This may be accomplished by coupling the record input 52 to only one of the three heads within the scanner head assembly 32.

When it is desired to playback stored video and audio signals, which may have been locally recorded or may be contained on a pre-recorded program reel, the mode switch 36 is switched to a "playback"mode, causing a single pole, single throw switch 60 to close and connect a power supply voltage, such as −12 volts DC, to a playback post-processor 62 and to a control line 64 coupled to a mute circuit 66, to be described later. As the servo control 54 drives the pair of motors 30 and 34, the video and audio information stored on tape 20 is detected by all three heads within the scanner head assembly 32, producing output information on a playback output 66 which is coupled to the now activated playback post-processor 62. The reproduced information is then coupled to the playback/record switching circuit 38 for coupling over a video line 70 and an audio line 71.

Since all three heads within scanner head assembly 32 are active in playback, three duplicate fields are reproduced for each complete rotation of the scanner head assembly. Thereafter the next recorded odd or even field is played back three times. Interfacing is maintained as recorded fields alternate between odd and even due to skip field recording every third field. The three heads are mechanically staggered to cause each head to read the same track during a single revolution of the disk.

The control track on the tape produces output pulses used by servo control 54 to control the instantaneous speed (position) of the scanner head assembly 32 during playback thereby assuring proper tracking of the heads relative to the video information. Basically, the scanner head assembly 32 is servoed or electronically controlled by vertical sync pulses during the record mode, and is servoed or electronically controlled by the control track during the playback mode.

The output video and audio information is coupled to a playback adaptor 74, which essentially is a low power television transmitter which, in response to the video and audio information on line 70 and 71, produces a composite television signal identical in form to the signal broadcast by a television transmitter. This allows the VTR to be used with a conventional unmodified television receiver 22. The playback adapter 74 is also useful to interface various external accessories, such as television camera 40, microphone 48, and record adapter unit 42, increasing the versatility of the system.

Playback adapter 74 includes audio amplifier circuit 46 which couples an audio ouput signal to an FM modulator 76 to frequency modulate a 4.5 megahertz carrier signal. The modulated audio output signal is then coupled over a line 77 to a novel modulator circuit 78, shown in detail in FIG. 2, which amplitude modulates a carrier at 67.25 megahertz with the video information on line 70, and mixes the carrier with the 4.5 megahertz audio FM modulated signal. The resultant composite signal coupled via output line 79 to television receiver 22 is thus identical to a composite television signal broadcast over channel 4. Television receiver 22 then demodulates the composite signal to reproduce the video and audio information on the cathode ray tube 24 and the loudspeaker 26, respectively.

When the VTR is switched from the playback mode to a "standby" mode, there is a transient period during which the magnetic tape 20 is driven at an accelerated speed with respect to the scanner head assembly 32. This results in a rapid variation in the audio signal on line 71, which results in unintelligible signals being reproduced by loudspeaker 26. This objectionable transient response is prevented by defeating the operation of the audio amplifier circuit 46 for a temporary interval of 10 to 15 seconds following the switching of the VTR from playback to the standby mode. After the lapse of this time period, the muting of the audio amplifier circuit 46 is released to allow, for example, the microphone 48 or the record adapter unit 42 to be utilized during the standby mode. This is accomplished by monitoring the power supply voltage on line 64, and selectively controlling the mute circuit 66 in accordance with the level and direction of change of the power supply voltage.

Figure 2:
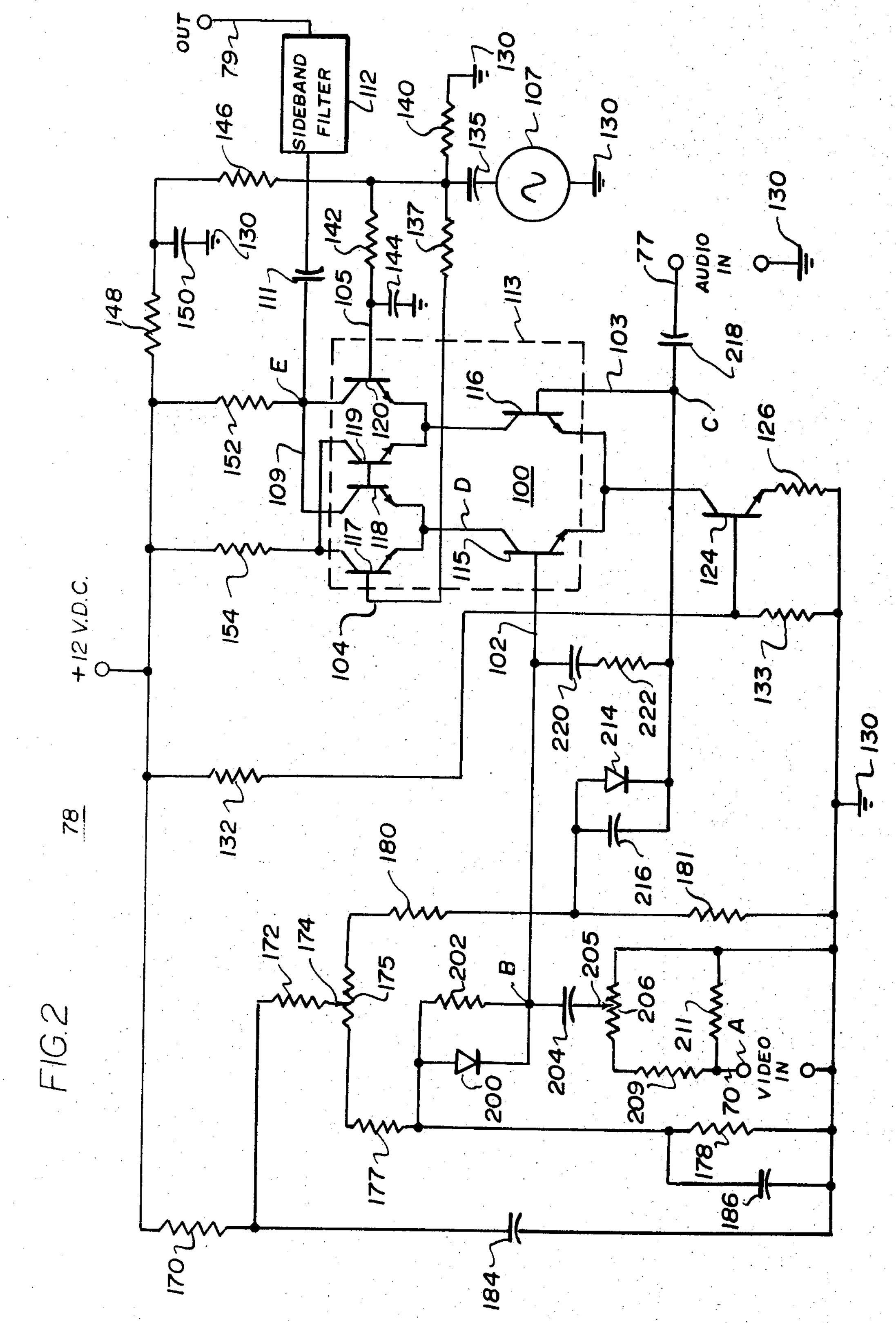
FIG. 2 is a schematic diagram of the modulator circuit shown in block form in FIG. 1.

In FIG. 2, the modulator circuit 78 is illustrated in detail. A differential amplifier 100 has first and second inputs 102 and 103 for the composite video signal and the FM audio signal, and third and fourth inputs 104 and 105 for the 4.5 megahertz carrier signal generated by a carrier oscillator 107. A differential amplifier output 109 couples the resulting composite signal (which has both lower and upper sidebands) through a coupling capacitor 111 to a side band (SB) filter 112 in order to attenuate most of the lower sideband so as to simulate a vestigial sideband video signal such as is produced by a commercial television transmitter. The simulated vestigial sideband signal is then coupled via line 79 to the unmodified television receiver for conventional detection thereof.

Differential amplifier 100 is formed on a common monolithic substrate 113 which includes two independent differential amplifiers with associated constant current sources. The dual independent amplifiers and current sources are formed by six NPN transistors 115, 116, 117, 118, 119 and 120, internally connected as illustrated within the dashed lines of substrate 113. The substrate 113 with the illustrated transistors and internal connections may be formed by a conventional linear integrated circuit, such as an RCA type CA3026.

The emitters of transistors 115 and 116 are coupled directly together and to the collector of a constant current transistor 124 having an emitter coupled through an emitter resistor 126 to a reference source or ground 130. The base of constant current transistor 124 is maintained at a fixed potential by connection to the junction between a pair of voltage divider resistors 132 and 133 which are in series between B+ and ground 130. The B+ supply may be formed by +12 volts DC.

The RF carrier signal from RF carrier oscillator 107 is coupled through a capacitor 135 and a resistor 137 to third input 104, and drives transistor 117 by the AC carrier oscillations. The junction between capacitor 135 and resistor 137 is shunted to ground through a resistor 140, and is coupled through a resistor 142 to input 105. The input 105 is AC grounded through a capacitor 144 which shunts the RF carrier oscillations so that the fourth input 105 receives only a DC bias level. The junction between resistors 140 and and 142 is coupled in series through resistors 146 and 148 to the +12 volt DC supply. A capacitor 150 shunts the junction of resistors 146 and 148 to ground 130.

Differential amplifier output 109 is formed by direct connection between the collectors of transistors 118 and 120. This connection, which corresponds to a junction E, is coupled through a resistor 152 to the positive supply line. The collectors of transistors 117 and 119 are directly coupled together, and through a common resistor 154 to the +12 volt supply.

The operation of differential amplifier 100 when connected in a modulator circuit as described above, and omitting the interaction with the remaining parts of FIG. 2 as will be described, is well known and will not be described in detail. When a modulating signal is applied to input 102 and an RF carrier is applied to input 104, a double sideband output signal appears at output 109 and has a modulation characteristic dependent on the DC biases applied to inputs 102 and 103. For equal bias levels, the output is a double sideband suppressed carrier (DSBSC) signal. As the bias levels are offset in one direction, the output changes to a DSB signal with positive modulation. As the bias levels are offset in the opposite direction, the output changes to a DSB signal with negative modulation. For purposes of television transmission/regeneration of a composite television signal, negative modulation is desired.

Concerning now the remaining parts of the circuit, the bias levels for inputs 102 and 103 are established by a resistive divider chain including resistors 170 and 172 connected between +12 volts and a wiper 174 of a potentiometer 175. One side of the potentiometer 175 is connected through a pair of resistors 177 and 178 to ground 130, forming a first bias supply. The opposite side of potentiometer 175 is connected through a pair of resistors 180 and 181 to ground 130, forming a second bias supply which temperature tracks the first supply. The resistance values of resistors 177 and 180 are identical, as are the resistance values of resistors 178 and 181. To maintain the resistive supply at a relatively fixed value, regardless of downstream signal conditions, a capacitor 184 is connected between the junction of resistors 170 and 172 and ground 130. A capacitor 186 shunts resistor 178.

The junction between divider resistors 177 and 178 is coupled to a diode-capacitor network for coupling the desired DC level to input 102, and for providing DC reinsertion for the video signal available on line 70. The network includes a diode 200 coupled between the divider junction and a junction B which directly connects with input 102. The diode 200 is shunted by a high resistance resistor 202. A capacitor 204 couples junction B to a wiper 205 of a potentiometer 206 having one side connected to ground 130, and the other side coupled through a resistor 209 to video input line 70, which corresponds to a junction A. The junction A is shunted to ground through a resistor 211.

To provide a DC path to input 103, which DC path is similar to the DC path to input 102, the junction between resistor 180 and 181 is coupled through a diode 214 to a junction C directly connected with input 103. A capacitor 216 shunts the diode 214. The junction C is also coupled through a capacitor 218 to the audio input line 77, to mix the FM audio signal with the amplitude modulated video information signal. To provide common mode rejection, the junctions B and C are AC coupled together through a high impedance path, formed by a capacitor 220 in series with a resistor 222.

Figures 3, 4:
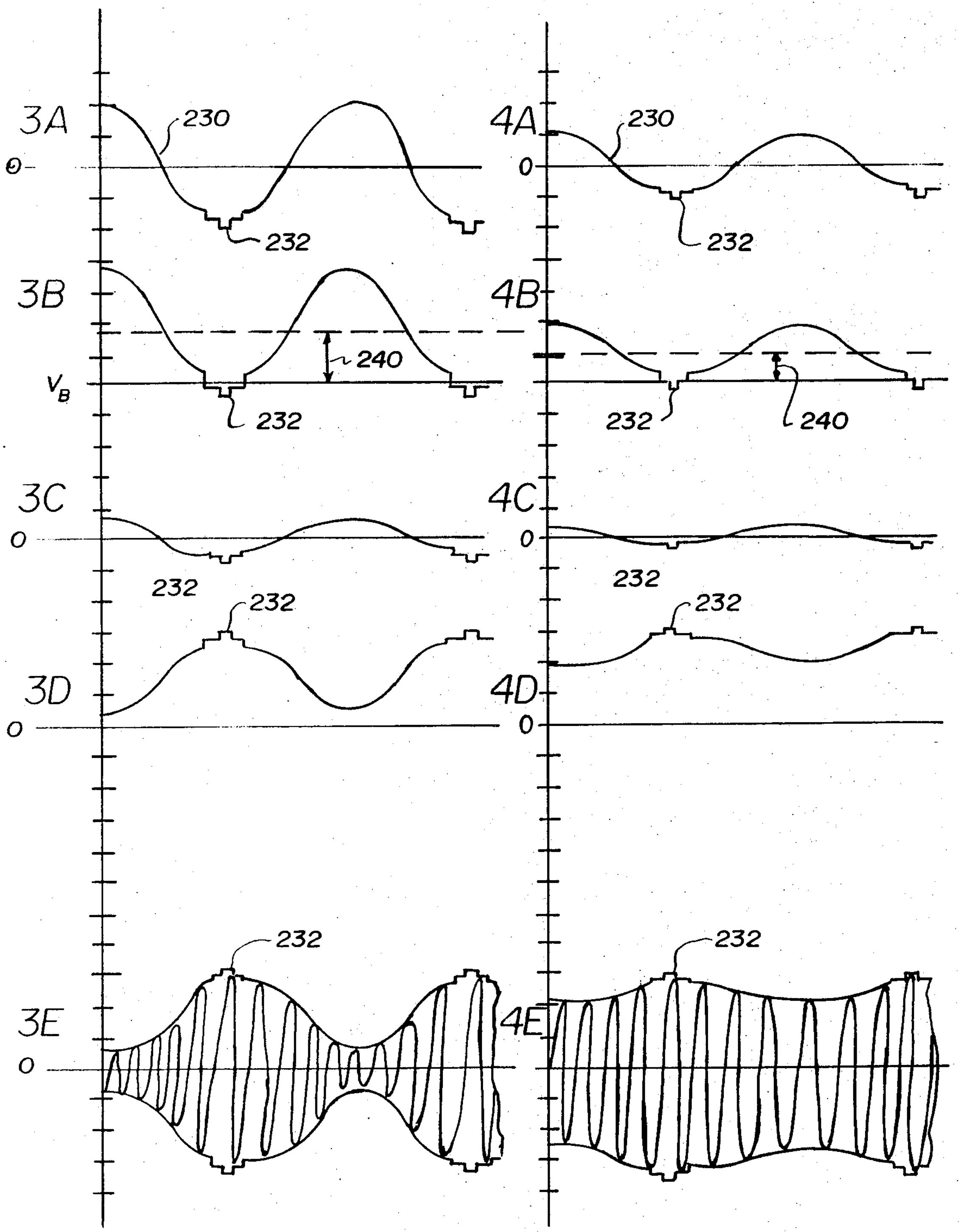
FIGS. 3A, 3B, 3C, 3D and 3E illustrate waveforms occurring respectively at junctions A, B, C, D and E in FIG. 2 for a large input video signal.
FIGS. 4A, 4B, 4C, 4D and 4E illustrate waveforms occurring respectively at junctions A, B, C, D, and E in FIG. 2 for a small input video signal.

The operation of the circuit will now be explained with reference to FIGS. 3 and 4, which show waveforms at various junctions in the circuit for large and small input signal conditions. FIG. 3 illustrates waveforms occurring when the video signal at junction A has a large amplitude, as shown in FIG. 3A. FIG. 4 shows the waveforms occurring when the video signal at junction A has a small amplitude, as shown in FIG. 4A. The video signal consists of a video information component 230 and recurring horizontal sync pulses 232.

Due to back biasing of diode 200 by the video signal, a charge is developed across capacitor 204 and causes a DC level shift or offset in the video signal at junction B. The junction B signal, FIGS. 3B and 4B, varies about or is offset from a fixed DC level $V_B$. $V_B$ is equal to the voltage level at the junction between resistors 177 and 178, minus the voltage drop in diode 200. This voltage level is maintained relatively stable due to the presence of capacitor 186 which smooths out any rapid voltage changes caused by changes in the video signal. The diode 200-capacitor 204 network causes the video signal to have a DC level offset or shift 240, FIGS. 3B and 4B, which corresponds to the average DC value of the video signal. This level shift essentially clamps the tips of the sync pulses 232 with respect to level $V_B$ and appears to vary depending on the magnitude of the input video signal. This is believed to be caused by the small signal conduction characteristic of the diode. As a result, it appears that larger amplitude signals such as shown in FIG. 3B have a greater offset from level $V_B$.

To compensate for these slightly different offsets, an impedance comprising capacitor 220 and resistor 222 couples a diminished magnitude AC signal, illustrated in FIGS. 3C and 4C, to junction C. The diminished or cancellation signal is approximately in phase with the signal at input 102. Since the diminished magnitude signal is AC coupled, there is no DC level shift. This signal cancels a corresponding amount of the video signal applied to input 102 due to common mode rejection within differential amplifier 100. The signal at internal connection D within differential amplifier 100 therefore varies with respect to a fixed voltage level, that is, the sync tips occur at the same voltage level to maintain 85 percent modulation. The differential amplifier is biased to produce negative modulation, and thus the RF output signal at junction E, takes the form illustrated in FIGS. 3E and 4E.

During a set up procedure, a one volt peak to peak standard reference video signal is coupled to junction A, and wiper 205 of the potentiometer 206 is adjusted, while viewing an oscilloscope connected to junction E, to set the output video signal to an 85 percent modulation level. Thereafter, the modulator circuit will maintain a maximum 85 percent modulation level for all values of input video signals. As the temperature of the circuit changes, the biases from the voltage divider chain change in corresponding manners, preventing a relative shift in bias offset. Thus the circuit has temperature stability for a wide range of temperature values.

By way of illustration, certain of the components illustrated in FIG. 2 may have the following representative values;

TABLE I

| Component | | Value |
|---|---|---|
| Capacitors | 184 | 10 mf |
| | 186 | 10 mf |
| | 204 | 15 |
| | 216 | 10 mf |

TABLE I-Continued

| Component | | Value |
|---|---|---|
| | 220 | 10 mf |
| Resistors | 170 | 280 |
| | 172 | 680 |
| | 175 | 1 K |
| | 177 | 2.7 K |
| | 178 | 3.9 K |
| | 180 | 2.7 K |
| | 181 | 3.9 K |
| | 202 | 470 K |
| | 206 | 100 |
| | 209 | 47 |
| | 211 | 150 |
| | 222 | 560 |

I claim:

1. A modulator circuit for modulating a carrier signal with a modulating signal, comprising:

differential amplifier means having at least a first input, and a second input, carrier input means for coupling the carrier signal to the differential amplifier means, modulating input means for coupling the modulating signal to the first input, and common mode means for deriving from the modulating signal a cancellation signal which is AC coupled to the second input, the differential amplifier means effectively subtracting the cancellation signal from the modulation signal at the first input due to common mode rejection.

2. The modulator circuit of claim 1 wherein said common mode means comprises capacitor means and resistive means in series between the first input and the second input.

3. The modulator circuit of claim 1 wherein said modulating input means includes a DC reinsertion network for DC offsetting the modulating signal in proportion to the average DC value of the modulating signal.

4. The modulator circuit of claim 3 wherein said DC reinsertion network includes DC potential means for establishing a fixed DC level at a potential junction, diode means, capacitor means, means connecting said diode means and said capacitor means in series between said potential junction and a source of said modulating signal, with the connection between the diode means and the capacitor means being coupled to said first input.

5. The modulator circuit of claim 4 wherein said DC reinsertion network includes resistive means coupled in shunt across said diode means, said resistive means having a substantially high resistance value.

6. The modulator circuit of claim 4 wherein said DC potential means comprises a plurality of resistors connected in series to form a voltage divider, and capacitor means in shunt with at least one of said plurality of resistors to maintain said potential junction at said fixed DC level regardless of fluctuations in said modulating signal.

7. The modulator circuit of claim 1 including first bias means for DC coupling a first DC bias to the first input, second bias means for DC coupling a second DC bias to said second input, said first and second bias means having compensating voltage changes for a temperature change in the circuit.

8. A modulator circuit for amplitude modulating an RF carrier signal with a video signal having a video component and a recurring sync pulse component, comprising:

differential amplifier means having input means and output means for the amplitude modulated signal, carrier input means for coupling the RF carrier signal to the input means, and modulating input means for coupling the video signal to the first input means including diode means, capacitor means, and network means connecting said diode means and said capacitor means to produce in the video signal a varying DC offset in proportion to the average DC value of the video signal.

9. The modulator circuit of claim 8 wherein said modulating input means includes potential means for establishing a fixed potential at a potential junction, said network means connects said diode means and said capacitor means in series between said potential junction and a supply junction carrying the video signal, and means coupling the connection between the diode means and the capacitor means to said input means.

10. The modulator circuit of claim 9 wherein said modulating input means includes common mode means for deriving from the video signal a cancellation signal which is supplied to said input means, the differential amplifier means effectively subtracting the cancellation signal due to common mode rejection.

11. The modulator circuit of claim 10 wherein said common mode means includes a capacitor and a resistor in series between a pair of input terminals for said differential amplifier means.

12. The modulator circuit of claim 9 including a second potential means for establishing a second fixed potential at a second potential junction, and second diode means for connecting said second potential junction to said input means, the potential means having similar components to cause the fixed potentials to track for temperature variations in the circuit.

13. The modulator circuit of claim 8 wherein said modulating input means includes potentiometer means for varying the magnitude of the video signal which is coupled to the network means, the potentiometer means being adjustable to provide a perdetermined percentage modulation level for the amplitude modulated signal at said output means.

14. The modulator circuit of claim 8 including first bias means for supplying a first DC bias to said input means, second bias means for supplying a second DC bias to said input means, said first and second DC biases causing the differential amplifier means to produce a negative modulation signal with the sync pulse components producing maximum amplitude modulation of the RF carrier signal.

* * * * *